United States Patent Office 3,784,614

Patented Jan. 8, 1974

3,784,614

PROCESS FOR THE MANUFACTURE OF ALCOHOLS BY THE CATALYTIC HYDRATION DF OLEFINS

Wilhelm Ester and Wilhelm Heitmann, Herne, Germany, assignors to VEBA Chemie Aktiengesellschaft, Gelsenkirchen-Buer, Germany No Drawing. Continuation of abandoned application Ser. No. 651,945, July 7, 1967. This application Nov. 9, 1970, Ser. No. 78,722

Int. Cl. C07c *29/08, 29/04*

U.S. Cl. 260—641 17 Claims

ABSTRACT OF THE DISCLOSURE

An improved process for the preparation of alcohols by the catalytic hydration of olefins is disclosed. In the process the olefin and water are brought into contact with a catalyst comprising a support material such as bentonite impregnated with phosphoric acid, at a temperature not exceeding 280° C., and employing a water-to-olefin ratio of between about 0.8:1 and 1.1:1.

Under the aforesaid conditions "seepage" occurs, whereby the catalyst is continuously cleaned and accordingly undergoes no decline in activity. The preparation of the alcohols by the instant catalytic hydration of olefins can thus be effected with good results over long periods of operation.

This application is a continuation of application Ser. No. 651,945, filed July 7, 1967 now abandoned.

This invention relates to improvements in the preparation of alcohols by catalytic hydration of olefins and more particularly the present invention relates to a method for the preparation of alcohols by catalytic hydration of olefins wherein conditions are maintained to prolong the useful life of the catalysts and maintain their activity while at the same time improving the efficiency of the process.

It is in the prior art to manufacture alcohols synthetically by passing olefins together with steam over certain catalysts. One of the best catalysts as heretofore employed consists preferably of $SiO_2$ impregnated with phosphoric acid. The conditions of the synthesis reaction are such that the reaction is carried out at temperatures of above 150° C., preferably between about 240 and 320° C., using pressures between about 20 and 80 atm. Approximately 0.4 to 0.8 mol of water is used in the form of steam per mol of olefin. The catalyst support material can be selected from various substances, as for example kieselguhr or silica. In particular, catalysts on a diatomaceous earth basis have achieved particular technical importance in practice, as have catalysts prepared on a basis of montmorillonite.

A known process that has proven particularly valuable industrially is carried out in the temperature range between about 280 and 300° C., in such a manner that a phosphoric acid concentration of between 75 and 85% establishes itself on the catalyst. It is important in this process that the catalyst bed be kept "dry." This means that no acid pick-up occurs on the catalyst bed with the exception of the amount that is carried along i.e., entrained with the gas. In this process, therefore, the acid losses are limited substantially to the acid that is lost only due to its partial pressure. The catalyst support in this process is a material containing diatomaceous earth such as is obtainable under the commercial name Celite. The water-to-ethylene ratio in his process amounts in practical performance to about 0.56 to 0.65:1 (see U.S. Pat. 2,579,601). One disadvantage of this process lies particularly in the fact that the performance of the catalyst becomes substantially poorer if the temperature drops to lower than 280° C. Loss of catalyst activity sets in after a relatively short time of operation.

All proposals and attempts to improve the synthesis have resulted in similar findings. Thus for example, it has been found that an optimum ethanol production can be achieved when the water-to-ethylene ratio lies between about 0.6 to 0.7:1, while very poor results are obtained if the ratio is increased to 0.8:1 (Chemistry and Industry 1962, p. 830 seq., especially p. 837, May 12, 1962).

It is one object of the present invention to provide an improved method for the preparation of alcohols by catalytic hydration of olefins.

Another object of the present invention is to provide a reactivation process for the catalysts employed in the synthesis without interrupting flow of feed or modifying the composition thereof.

A further object of the invention is to provide a method for the hydration of olefins in the presence of catalysts which can be effected with good results over long periods of operation.

Still further objects will become apparent from the following description:

The present invention is based on the discovery that the disadvantages of the previously known methods can be avoided by selecting the reaction conditions in such a manner that at least 90% of the phosphoric acid withdrawn i.e., carried off from the reaction is carried off not through partial pressure but in liquid form along with the reaction gas. In other words, of the phosphoric acid that is carried off, only a very small amount of less than 10% is removed by way of partial pressure.

In accordance with the invention it has now been found that the above objects are attained by bringing olefin and water into contact with a catalyst containing phosphoric acid under the following conditions:

(a) A temperature which is below 280° C.; in the case of ethylene, the temperature employed is between 250 and 270° C. and in the case of propylene the temperature is preferably between 160 and 250° C. (all temperatures are referred to entry into the catalytic reactor).

(b) A water-to-olefin ratio of between about 0.8:1 and 1.1:1, and preferably between 0.9:1 and 1.0:1.

(c) A catalyst comprising a mineral clay silicate, preferably a bentonite containing material having an $Al_2O_3$ content of less than 10% (these catalysts are described in German Green Pat. 1,156,772) impregnated with phosphoric acid.

Under these conditions, the process is deliberately carried out in such a manner that "seepage" (U.S. Pat. 2,579,601) occurs, which according to the state of the art is supposed to be avoided at all costs. When a suitable catalyst is used, such as the one described above, it has been found that the conversion of the olefin is substantially better below 280° C. than it is at higher temperatures, and that the formation of byproducts is considerably reduced. The cause of this surprising fact is probably that, under the conditions selected, i.e., with a deliberately caused seepage, the catalyst is continuously cleaned and thereby retains its high activity. The pore volume and interior surface area of the catalyst, which is important for the synthesis, are kept constantly free of undesirable contamination and clogging by this procedure, and the catalyst is therefore kept at an extraordinarily high level of activity.

An important advantage for carrying out the process technically lies furthermore in the fact that the amount of coating produced inside of the apparatus, especially in the heat exchanger, is substantially reduced, so that these parts of the apparatus do not have to be cleaned as often as they do in the processes known hitherto.

The advantages of the process of the invention can be enhanced if, from time to time (i.e., after about 6 to 12 months of operation), the process conditions are adjusted so that, for a fairly short period (for example a few hours) a substantially greater seepage is caused. This can be achieved by reducing the temperature to a level where several times the normal seepage occurs, the maximum seepage being achieved by cooling the circulating gas down to the dew point. The cleaning process can also be carried out by increasing the water-to-ethylene ratio just up to the dew point of the circulating gas. If desired, both methods can be combined. What takes place, therefore, is a process of displacement, in which the contaminants are flushed out of the catalyst solids.

The pressures in the process of the invention generally range between about 10 and 80 atm.

In contrast to the state of the art, the concentration of phosphoric acid during the process is kept relatively low, i.e., under 70%. The concentration adjusts itself automatically during the process. It is entirely independent of the water vapor partial pressure selected in each case and of the temperature. In practice it can amount to about 55%, for example.

In the process of the prior art which has been discussed above, one of the important objects was to prevent seepage so as to reduce corrosion in the apparatus as much as possible. An important advantage of the procedure of the invention consists in the fact that, due to the mild conditions of operation, the danger of corrosion is substantially eliminated. Fundamentally, it is possible in the process of the invention to operate without anticorrosive measures that are out of the ordinary. The reaction can be conducted, for example, in copper clad reactors. Here again, however, it is especially advantageous to use apparatus, of the type used in the procedure described in German Green Pat. 1,136,319. The interior walls of the disclosed apparatus are lined with carbon brickwork, it being advisable to make the pore volume of these bricks such that a sufficient passage of gas between the reactor wall and the interior of the reactor is assured.

One of the important requirements for carrying out the process of the invention is met by the preferential use of catalysts containing montmorillonite. These catalysts permit the process to be conducted under the relatively mild conditions specified. In the process presently used in the art, which has been described above, the disadvantage may arise that the diatomaceous earth catalysts are no longer active enough in the low temperature range to permit economical production. This becomes clear if we consider the article published in "Chemistry and Industry" of May 12, 1962, which was cited in the beginning. It appears from the diagrams shown therein (No. 12) that optimum results can be achieved in the reaction at temperatures of about 300° C.; at substantially low temperatures of 265 to 270° C., at which the catalyst of the invention is preferentially utilized, it is no longer possible to achieve any particularly economical alcohol production according to the above-mentioned diagrams.

Clay mineral silicates which may be used as catalysts in the process of the invention are for example:

| | |
|---|---|
| Bentonite | Beidellite |
| Kaolinite | Hectorite |
| Dickite | Saponite |
| Nacrite | Chlorite |
| Halloysite | Chrysotile |
| Endellite | Glauconite |
| Illite | Attapulgite |
| Montmorillonite | |

The details of the present invention will become apparent to those skilled in the art from a consideration of the following examples which are given by way of illustration and without any intention that the invention be limited thereto.

EXAMPLE 1

40,000 m.$^3$ of an approximately 85% ethylene gas was circulated in a reaction furnace of conventional construction, having a capacity of about 38 m.$^3$ and which had been lined with carbon bricks having a pore volume of 20% in two layers of 25 mm. each, and which furthermore had been filled with catalyst. The catalyst consisted of spherical cracking catalyst made of bentonite (diam. 3–5 mm.; manufactured by Sud-Chem; manufacturer's product Nos. K–306 and K–307).

The catalyst support material had been treated by washing with 15–20% hydrochloric acid at 100–118° C., then repeated washing with water until all soluble aluminum salts and free HCl had been removed; thereafter by impregnation with 60–80% phosphoric acid until saturated; the excess phosphoric acid then drained off and the catalyst dried with air at 110 to 120° C. 2200 m.$^3$ of fresh gas having a concentration of 99.8% $C_2H_4$ and an acetylene content of less than about 30 p.p.m. was added hourly to the gas. Approximately 27 m.$^3$ of 85% ethylene was discharged per hour and exhausted as tail gas. At the same time, 26.5 metric tons of water in the form of steam was mixed in with the circulating ethylene and about 6.5 kg. of phosphoric acid, calculated at 100%, was introduced into the circulation to make up for what had been carried off. Approximately 33.8 metric tons of a 13.6% ethyl alcohol were separated per hour. (From the regenerators or in the gas washer connected to the discharge outlet of the reactor.) The reaction temperature was maintained at 265° C. at the entry into the catalytic reactor. In the case of the quantities stated above, the water-to-ethylene ratio amounted to about 0.9:1. The ethyl alcohol yield was 97.1% with reference to reacted ethylene.

EXAMPLE 2

In a reaction furnace filled with catalyst as described in Example 1, ethyl alcohol was prepared using a temperature of 265° C. in the reaction mixture entering the furnace. The activity of the catalyst dropped off by about 15% after one year of operation, and no more than 1900 m.$^3$ of fresh gas could be processed under the same conditions as in Example 1. Furthermore, the yield had dropped to 95.5% due to the formation of byproducts.

The temperature was then reduced within one hour from 265° C. to 255° C. which resulted in the carrying out of dilute phosphoric acid in an amount increasing up to 30 times the normal, calculated as 100% phosphoric acid, the concentration of the phosphoric acid being carried off decreased continually, so that the amount of liquid carried along together with the catalyst and contaminated with organic products amounted to from 2 to 3 times the amount of phosphoric acid.

After the reaction conditions had been sustained for about 2 to 3 hours at a reaction mixture input temperature of 255° C., the temperature was slowly raised back up to 265° C. within one hour.

The fresh gas input of 1900 m.$^3$/h. could then be increased up to about 2150 m.$^3$/h. The yield increased from 95.5 to 96.7%.

EXAMPLE 3

In a catalyst furnace containing 38 m.$^3$ of catalyst as described in Example 1, 25,000 m.$^3$ of a 97% propylene were circulated hourly. At the same time 18.5 metric tons of steam and 5 kg. of phosphoric acid (calculated at 100%) were mixed in with the circulating propylene. 1480 m.$^3$ of fresh propylene (9.9%) were added hourly to the gas. The operating pressure amounted to 40 atmospheres and the temperature was 218° C. at the entrance to the catalyst furnace. The water-to-propylene ratio was approximately 0.93:1. Approximately 31 metric tons of dilute spirits having a concentration of 12.6% were separated from the circulating gas after cooling in the heat exchangers and gas washer. 45 m.$^3$ of propylene were discharged hourly. The yield amounted to 97.5% with reference to converted propylene.

What is claimed is:

1. In the hydration of an olefin to produce the corresponding alcohol wherein a gaseous mixture containing said olefin and water vapor at a water-to-olefin molar ratio in the range of 0.8:1 to 1.1:1 along with make-up phosphoric acid is circulated at an elevated temperature as measured at the reactor inlet in the range of 160° to 280° C. and at a pressure of about 10–80 atm. over a phosphoric acid catalyst impregnated on a porous mineral clay silicate support and said alcohol is recovered from the gaseous reaction products which also contain phosphoric acid stripped from said support, with at least 90 weight percent of said phosphoric acid stripped from said catalyst being in the form of liquid entrained in said gaseous reaction products, the improvement which comprises periodically increasing seepage of said phosphoric acid from said support to flush out contaminants from the catalyst solids by reducing the temperature of the circulating gas to a level where several times the normal seepage occurs and thereafter restoring normal operation.

2. Process of claim 1 wherein seepage is periodically increased by cooling the circulating gas down to the dew point.

3. Process of claim 1 wherein the water-to-olefin ratio is in the range of 0.9:1 to 1.0:1.

4. Process of claim 1 wherein said olefin is selected from the group consisting of ethylene and propylene.

5. Process of claim 1 wherein the olefin is ethylene, the mineral clay silicate support contains less than 10 weight percent $Al_2O_3$, and the temperature is in the range of 250–270° C.

6. Process of claim 1 wherein the olefin is propylene, the mineral clay silicate support contains less than 10 weight percent $Al_2O_3$, and the temperature is in the range of 160–250° C.

7. In the hydration of an olefin to produce the corresponding alcohol wherein a gaseous mixture containing said olefin and water vapor at a water-to-olefin molar ratio in the range of 0.8:1 to 1.1:1 along with make-up phosphoric acid is circulated at an elevated temperature as measured at the reactor inlet in the range of 160° to 280° C. and at a pressure of about 10–80 atm. over a phosphoric acid catalyst impregnated on a porous mineral clay silicate support and said alcohol is recovered from the gaseous reaction products which also contain phosphoric acid stripped from said support, with at least 90 weight percent of said phosphoric acid stripped from said catalyst being in the form of liquid entrained in said gaseous reaction products, the improvement which comprises periodically increasing seepage of said phosphoric acid from said support to flush out contaminants from the catalyst solids by increasing said water-to-olefin molar ratio in the circulating gas just up to the dew point thereof and thereafter restoring normal operation.

8. Process of claim 7 wherein the water-to-olefin ratio is in the range of 0.9:1 to 1.0:1.

9. Process of claim 7 wherein said olefin is selected from the group consisting of ethylene and propylene.

10. Process of claim 7 wherein the olefin is ethylene, the mineral clay silicate support contains less than 10 weight percent $Al_2O_3$, and the temperature is in the range of 250–270° C.

11. Process of claim 7 wherein the olefin is propylene, the mineral clay silicate support contains less than 10 weight percent $Al_2O_3$, and the temperature is in the range of 160–250° C.

12. In the hydration of an olefin to produce the corresponding alcohol wherein a gaseous mixture containing said olefin and water vapor at a water-to-olefin molar ratio in the range of 0.8:1 to 1.1:1 along with make-up phosphoric acid is circulated at an elevated temperature as measured at the reactor inlet in the range of 160° to 280° C. and at a pressure of about 10–80 atm. over a phosphoric acid catalyst impregnated on a porous mineral clay silicate support and said alcohol is recovered from the gaseous reaction products which also contain phosphoric acid stripped from said support, with at least 90 weight percent of said phosphoric acid stripped from said catalyst being in the form of liquid entrained in said gaseous reaction products, the improvement which comprises periodically increasing seepage of said phosphoric acid from said support to flush out contaminants from the catalyst solids by reducing the temperature of the circulating gas to a level where several times the normal seepage occurs and increasing said water-to-olefin molar ratio in the circulating gas just up to the dew point thereof, and thereafter restoring normal operation.

13. Process of claim 12 wherein seepage is periodically increased by cooling the circulating gas down to the dew point.

14. Process of claim 12 wherein the water-to-olefin ratio is in the range of 0.9:1 to 1.0:1.

15. Process of claim 12 wherein said olefin is selected from the group consisting of ethylene and propylene.

16. Process of claim 12 wherein the olefin is ethylene, the mineral clay silicate support contains less than 10 weight percent $Al_2O_3$, and the temperature is in the range of 250–270° C.

17. Process of claim 12 wherein the olefin is propylene, the mineral clay silicate support contains less than 10 weight percent $Al_2O_3$, and the temperature is in the range of 160–250° C.

References Cited

UNITED STATES PATENTS

| | | | |
|---|---|---|---|
| 2,174,610 | 10/1939 | Weir | 252—450 |
| 2,283,174 | 5/1942 | Bates | 252—450 |
| 2,496,621 | 2/1950 | Deery | 260—641 |
| 2,579,601 | 12/1951 | Nelson et al. | 260—641 |
| 3,232,997 | 2/1966 | Ester | 260—641 |

FOREIGN PATENTS

| | | | |
|---|---|---|---|
| 1,293,733 | 4/1969 | Germany | 260—641 |
| 1,193,929 | 6/1965 | Germany | 260—641 |
| 511,441 | 3/1955 | Canada | 260—641 |

LEON ZITVER, Primary Examiner

J. E. EVANS, Assistant Examiner

U.S. Cl. X.R.

252—411